Aug. 21, 1956  S. BOWMAN ET AL  2,759,374
CRAWLER TRANSMISSION
Filed Feb. 1, 1954  2 Sheets-Sheet 1

*INVENTORS*
SPENCER BOWMAN &
FERDINAND A. KRAUSS, JR.
BY

ATTORNEY

United States Patent Office 2,759,374
Patented Aug. 21, 1956

2,759,374

CRAWLER TRANSMISSION

Spencer Bowman and Ferdinand A. Krauss, Jr., Bay Village, Ohio, assignors, by mesne assignments, to Westinghouse Air Brake Company, a corporation of Pennsylvania Application February 1, 1954, Serial No. 407,460

5 Claims. (Cl. 74—750)

This invention relates broadly to certain new and useful improvements in gear transmission, but more particularly to a crawler transmission, that is, a transmission for power propelled slow moving equipment such as continuous mining machines and the like.

One object of this invention is to produce a reliable variable transmission mechanism, wherein all gears remain in constant mesh, thereby eliminating gear shifting and the often encountered difficulties pertaining thereto.

Another object of this invention is to produce an improved transmission for endless track propelled machines, which is compact, efficient and self-contained within the sprocket wheel driving the track.

Another object of this invention is to produce an improved transmission particularly adaptable for the propulsion of slow moving equipment such as a continuous mining machine, where relatively low speed and high torque ratios are essential.

Another object of this invention is to provide a transmission of the above type so constructed as to permit ready accessibility to the mechanism in order to facilitate repair or replacement of various parts.

Other objects of this invention will be apparent from the following detailed description, wherein similar characters of reference designate corresponding parts, and wherein.

Figure 1:
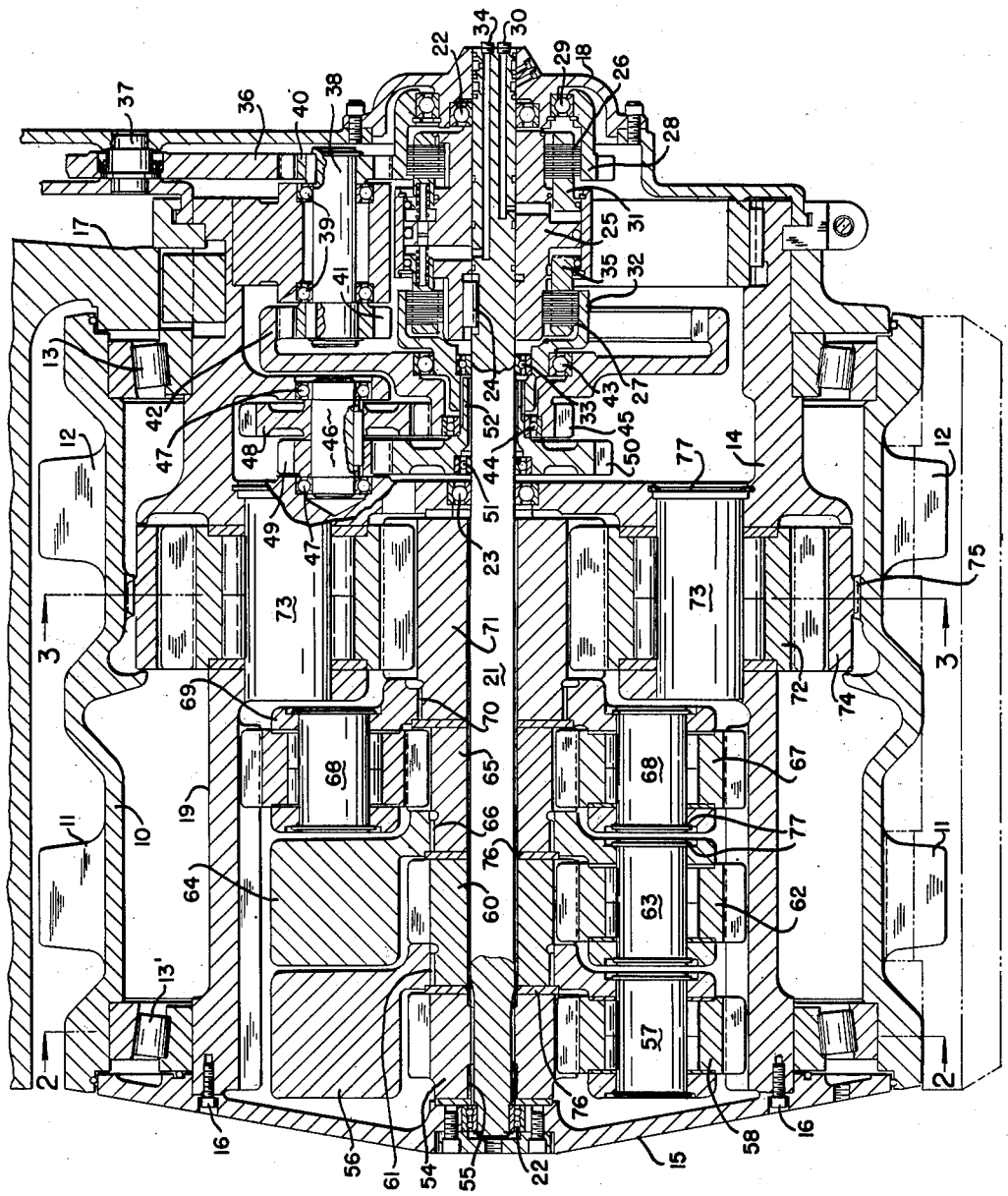
Figure 1 is a longitudinal sectional view of a gear transmission mechanism constructed in accordance with the invention.
Figure 2:
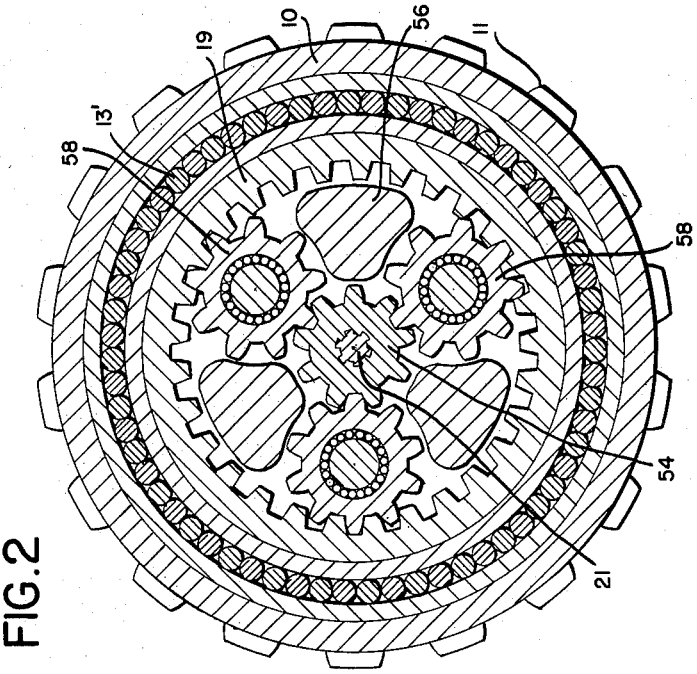
Figure 2 is a cross sectional view taken on line 2—2 in Figure 1.
Figure 3:
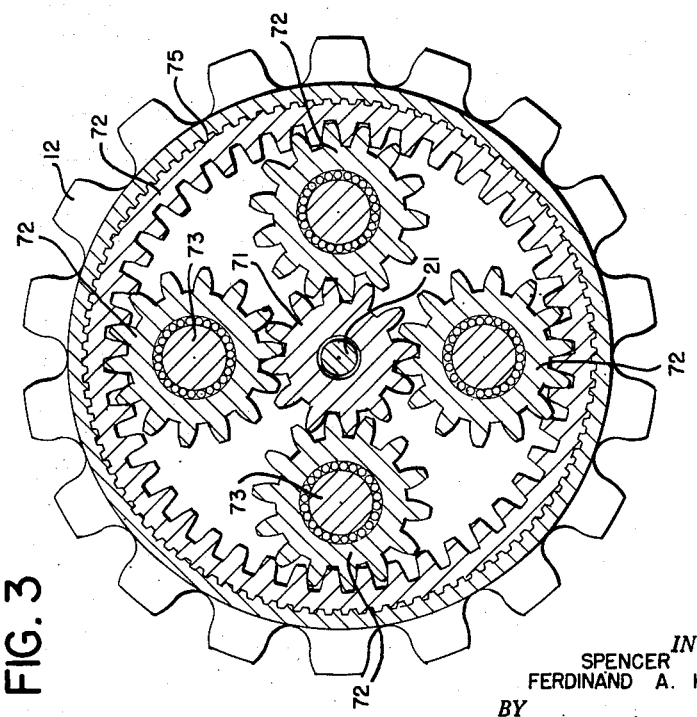
Figure 3 is a cross sectional view taken on line 3—3 in Figure 1.

Referring to the drawings, the improved gear transmission is shown housed within a cylindrical hollowed member forming the driving sprocket wheel 10 of an endless flexible track through which motion is imparted to such equipment as a continuous coal mining machine or the like, it being understood that in practice two wheels and tracks are being used, one on each side of the machine. Wheel 10 is a relatively large and long tubular shell having integrally formed on its peripheral wall two longitudinally spaced sets of sprocket teeth 11 and 12 adapted for operative engagement with the corresponding teeth of the machine's endless track. Wheel 10 has its ends supported on two roller bearings 13 and 13', the first one being mounted on a stationary cup-shaped gear casing 14 and the last one on a stationary ring gear 19 which has its outer normally open end closed by a cap 15 secured thereto by screws 16. The inner end portion of casing 14 is fixed to the machine with which it is associated, by any suitable means such as a bracket 17, and has its outer normally open end closed by a cap 18. A central shaft 21 extends longitudinally throughout wheel 10 were it is supported by end bearings 22 provided within caps 15 and 18, and by a central bearing 23 mounted within the bottom wall of cup shaped casing 14. Adjacent cap 18, shaft 21 has fixed thereto by a key 24 a clutch member 25, with which are operatively associated two disk type clutches 26 and 27. Clutch 26 is also operatively associated in the usual manner with a gear 28 mounted on a bearing 29 carried within the cap 18, and it can be operated by admission of pressure fluid behind a ring member 31 through a port 30 provided in shaft 21. Clutch 27 is operatively associated in the usual manner with a cup shaped member 32 rotatably supported by bearing 33 mounted on shaft 21, and it can be operated by admission of pressure fluid behind a ring member 35, through a port 34 provided in shaft 21.

The primary gear 36 is rotatably supported on a cross shaft 37, and has rotation imparted thereto by any suitable source of power, such as a reversible electric motor, not shown. From this gear, primary rotation may be transmitted to shaft 21 in opposite direction at two greatly different rates of speed, hereinafter referred to as high and low speeds, through two different primary gear trains having a common stub arbor 38 journalled within bearings 39 and carrying, on one end thereof, a fixed pinion 40 in mesh with primary gear 36. Pinion 40 is in direct mesh with gear 28, thereby causing, upon operation of clutch 26, high speed rotation to be transmitted to shaft 21 in the same direction as that of primary gear 36.

A pinion 41, fixed on the other end of stub arbor 38, is in mesh with a relatively large ring gear 42 internally supported by two bearings 43 and 44, and having a reduced hub portion forming a small gear on pinion 45. On another stub arbor 46 journalled within bearings 47, there is fixed a gear 48 in mesh with pinion 45 and on the same arbor there is also fixed a pinion 49 in mesh with a relatively large gear 50 which is rotatably supported on shaft 21 by a bearing 51. Gear 50 has a hub portion extending to the right in Figure 1 over shaft 21, which is connected to cup-shaped clutch member 32 by splines 52. It will thus be understood that upon operation of the clutch 27, rotation from the primary gear 36 is transmitted to shaft 21 at a low rate of speed and in a direction opposite to that of gear 36.

Shaft 21 which, upon operation of either clutches 26 or 27, has rotation in either direction imparted to its input end, has a small sun gear 54 fixed on its output end by splines 55. From this sun or end gear 54, rotation is transmitted to the sprocket 10 at a high torque low speed ratio through a speed reduction gearing including a plurality of sets of planetary like gears hereinafter referred to as first, intermediate and last sets. The first set comprises sun gear 54, a planet carrier 56 provided with three equally spaced stub arbors 57 operatively carrying planet gears 58 meshing with sun gear 54 and stationary ring gear 19. One intermediate set of planetary like gears includes a sun gear 60 fixed to the hub of carrier 56 by splines 61 for rotation therewith on shaft 21. Sun gear 60 is meshing with planet gears 62 which are also meshing with stationary ring gear 19 and mounted on stub arbors 63 carried by a planet carrier 64. Another intermediate set of planetary like gears includes a sun gear 65 fixed to the planet carrier 64 by splines 66 for rotation therewith on shaft 21. This last sun gear is meshing with planet gears 67 mounted on stub arbors 68 carried by a planet carrier 69, and meshing with stationary ring gear 19. The last set of planetary like gears includes a sun gear 71 fixed to the hub of the planet carrier 69 by splines 70 for rotation therewith on the shaft 21. This last sun gear is meshing with four equally spaced planet gears 72 mounted on stub arbors 73 extending between and carried by the opposite end walls of stationary ring gear 19 and gear casing 14. The planet gears 72 are meshing with a ring gear 74 drivingly connected to the inner wall of sprocket wheel 10 by any suitable means such as splines 75.

As clearly shown in Figure 1, the several ring gears on shaft 21 are separated by adequate bearing washers 76, while the stub arbors carried by the planet carriers are held in place by any suitable means such as split rings 77.

In the operation of the device, when it is desired to to move the machine, such as a continuous mining machine with which the device is associated, from place to place, that is, during the tramming operation of such machines, the high speed clutch 26 may be set into operation by admitting pressure fluid, from a pump preferably carried by the machine, through port 30 under the ring 31, thereby compressing the several disks of the clutch in the usual manner and imparting rotation to the clutch member 25. In this instance, rotation from primary gear 36 is transmitted to shaft 21 with practically no speed reduction. From the left or output end of shaft 21 as viewed in Figure 1, rotation is transmitted back toward the right or input end of the shaft to the sprocket wheel 10 through the several sets of planetary like gears at a greatly reduced rate, which in one application is calculated to be of a ratio of 438 to 1, thereby resulting in a relatively high-speed and low-torque output of the unit. In this instance, that is with clutch 26 in operation, forward and backward movement of the machine at relatively high speed is controlled by the reversible motor from which gear 36 derives its rotation. During one direction of rotation of gear 36, the machine is caused to rotate forwardly, while rotation to the gear in the other direction causes the machine to move rearwardly.

While it is desired to impart rotation to the sprocket wheel 10 at a very low speed and high torque ratio, such as needed during the mining operation when gradually feeding the machine to the work, the low speed clutch 27 may be set into operation by first releasing pressure fluid previously admitted to the ring 31, and admitting pressure under the ring 35 through the port 34. In this instance, rotation from the primary gear 36 in a direction causing the machine to move forwardly, is transmitted to the clutch member 25 through the speed reduction gear train housed within the cup-shaped member 14. From the clutch member 25, low speed rotation is again transmitted to the shaft 21 and therefrom to the sprocket wheel 10 in the manner above described. In the one application above referred to, the speed reduction of the unit operated through the low speed clutch 27 is calculated to be of a ratio of 5388 to 1, thereby resulting in a unit having a very low speed and very high torque output.

From the foregoing description, it will be understood that the driver or final gear 74 of the train is centrally located, or substantially so, between the sprocket wheel bearings 13 and 13′, thereby providing for equal load distribution with minimum distortion and enabling free and smooth operation of the sprocket. It will also be noted that by passing the power shaft 21 through the several sun gears, it is possible to produce a very compact unit entirely contained within the sprocket wheel 10. It will also be understood that widely different speed ratio may be obtained while all gears are in mesh, thereby eliminating gear shifting and the often encountered difficulties pertaining thereto.

While the preferred form of the invention has been shown and described, it will be understood that variation in detail and form may be made without departure from the spirit and scope of the invention as herein claimed.

We claim:

1. A transmission mechanism including a primary gear having rotation imparted thereto, a hollow wheel member supported for rotation on its longitudinal axis, a power shaft centrally throughout said member, power input and output ends for said shaft, means for transmitting rotation from said primary gear to said shaft selectively at different rates of speed including clutch means fixed on said input end, and means for transmitting rotation from said shaft to said member at a reduced rate of speed including first, intermediate and last sets of planetary type gears, each set including a sun gear, a plurality of planet gears adapted to revolve about said shaft and meshing with said sun gears, a stationary first ring gear meshing with the planet gears of said first and intermediate sets, the sun gear of said first set being fixed on the output end of said shaft and the other sun gears rotatable on said shaft, carriers for the planet gears of said first and intermediate sets drivingly connected to the sun gears of said intermediate and last sets, and a second ring gear drivingly connected to said wheel member and meshing with the planet gears of said last set.

2. A transmission mechanism according to claim 1, wherein said hollow wheel member is supported by axially spaced bearing means, and said second ring gear is located between said bearing means.

3. A transmission mechanism including a primary gear having rotation imparted thereto, a hollow substantially cylindrical wheel member, longitudinally spaced bearing means rotatably supporting said member, a power shaft centrally through said member, power input and output ends for said shaft, a duality of rotation transmitting gear trains between said primary gear and the input end of said shaft, means operable for selectively connecting either of said trains to said input end for imparting rotation to said shaft at different rates of speed, rotation transmitting means between said shaft and wheel member including first, intermediate and last sets of planetary type gears, each set including a sun gear and a plurality of planet gears adapted to revolve about said shaft in mesh with said sun gears, carriers for the planet gears of said first and intermediate sets drivingly connected to the sun gears of said intermediate and last sets, a stationary carrier for the planet gears of said last set, a stationary first ring gear meshing with the planet gears of said first and intermediate sets, the sun gear of said first set being fixed on the output end of said shaft and the other sun gear rotatable on said shaft, and a second ring gear between said bearing members drivingly connected to said wheel member and meshing with the planet gears of said last set.

4. A transmission mechanism including a primary gear having rotation imparted thereto, a hollow substantially cylindrical wheel member, coaxially disposed ring gear and gear casing fixed within said wheel member in supporting relationship therewith, longitudinally spaced rotary bearings for said wheel member carried by said ring gear and gear casing, a power shaft centrally through said wheel member, power input and output ends for said shaft, a duality of rotation transmitting gear trains between said primary gear and the input end of said shaft housed within said gear casing, means operable for selectively connecting either of said trains to said input end for imparting rotation to said shaft at different rates of speed, rotation transmitting means between said shaft and wheel member including first, intermediate and last sets of planetary type gears, each set including a sun gear and a plurality of planet gears adapted to revolve about said shaft in mesh with said sun gears, carriers for the planet gears of said first and intermediate sets drivingly connected to the sun gears of said intermediate and last sets, shaft means for the planet gears of said last set carried by said ring gear and gear casing, said ring gear meshing with the planet gears of said first and intermediate sets, the sun gear of said first set being fixed on the output end of said power shaft and the other sun gears rotatable on said shaft, and a second ring gear between said bearings drivingly connected to said wheel member and meshing with the planet gears of said last set.

5. A transmission mechanism including a primary gear having rotation imparted thereto, a hollow substantially cylindrical wheel member, longitudinally spaced bearing means rotatably supporting said member, a power shaft centrally through said member, power input and output ends for said shaft, a duality of rotation transmitting gear trains between said primary gear and the input end of said shaft, clutch means selectively operable for transmitting rotation from either of said gear trains to the input end of said shaft, rotation transmitting means between said shaft and wheel member including first, intermediate and last sets of planetary type gears, each set including a sun gear, a plurality of planet gears adapted to revolve about said shaft and meshing with said sun gears, a stationary first ring gear meshing with the planet gears of said first and intermediate sets, the sun gear of said first set being fixed on the output end of said shaft and the other sun gears rotatable on said shaft, a carrier for the planet gears of said first set rotatable thereby and drivingly connected to the sun gear of said intermediate set, a carrier for the sun gears of said intermediate set rotatable thereby and drivingly connected to the sun gear of said last set, and a second ring gear drivingly connected to said wheel member and meshing with the planet gears of said last set.

References Cited in the file of this patent

UNITED STATES PATENTS

| | | |
|---|---|---|
| 1,919,441 | Blakeslee | July 25, 1933 |
| 2,249,441 | Sussman | July 15, 1941 |
| 2,576,478 | Beckwith | Nov. 27, 1951 |
| 2,591,967 | Ridgely et al. | Apr. 8, 1952 |